(12) United States Patent
Wittelsbuerger et al.

(10) Patent No.: US 11,566,464 B2
(45) Date of Patent: Jan. 31, 2023

(54) DRIVE ARRANGEMENT FOR A FLAP OF A MOTOR VEHICLE

(71) Applicant: Brose Fahrzeugteile GmbH & Co. Kommanditgesellschaft, Bamberg, Bamberg (DE)

(72) Inventors: Michael Wittelsbuerger, Bamberg (DE); Harald Krueger, Bamberg (DE); Matthias Fischer, Itzgrund (DE); Andreas Gutgesell, Michelau (DE)

(73) Assignee: Brose Fahrzeugteile GmbH & Co. Kommanditgesellschaft, Bamberg, Bamberg (DE)

( * ) Notice: Subject to any disclaimer, the term of this patent is extended or adjusted under 35 U.S.C. 154(b) by 845 days.

(21) Appl. No.: 16/080,634

(22) PCT Filed: Mar. 1, 2017

(86) PCT No.: PCT/EP2017/054729
§ 371 (c)(1),
(2) Date: Aug. 28, 2018

(87) PCT Pub. No.: WO2017/148993
PCT Pub. Date: Sep. 8, 2017

(65) Prior Publication Data
US 2021/0198933 A1 Jul. 1, 2021

(30) Foreign Application Priority Data
Mar. 2, 2016 (DE) ..................... 10 2016 103 759.1

(51) Int. Cl.
*E05F 15/655* (2015.01)
*E05F 15/622* (2015.01)
*B60J 5/10* (2006.01)

(52) U.S. Cl.
CPC ............... *E05F 15/655* (2015.01); *B60J 5/10* (2013.01); *B60J 5/101* (2013.01); *E05F 15/622* (2015.01);
(Continued)

(58) Field of Classification Search
None
See application file for complete search history.

(56) References Cited

U.S. PATENT DOCUMENTS

| 9,636,978 B2 * | 5/2017 | Warburton | ............ E05F 15/622 |
| 2004/0124672 A1 * | 7/2004 | Eipper | ................... B62D 25/06 296/210 |

(Continued)

FOREIGN PATENT DOCUMENTS

| DE | 19844265 | 2/2002 | |
| DE | 102004056657 B3 * | 5/2006 | .............. B60J 7/205 |

(Continued)

OTHER PUBLICATIONS

Machine translation of DE102011114925A1.*
(Continued)

*Primary Examiner* — Marcus Menezes
(74) *Attorney, Agent, or Firm* — Pauly, DeVries Smith & Deffner LLC

(57) ABSTRACT

The disclosure relates to a drive arrangement for a flap of a motor vehicle, comprising a linear drive for producing drive movements and comprising a transmission arrangement, which is coupled to said linear drive, for transmitting the drive movements, a compensating arrangement being provided which couples two drive elements of the drive arrangement to each other in terms of drive, and, when a limit load between the two drive elements is exceeded, the compensating arrangement permitting a guided compensating movement between the two drive elements. It is pro- (Continued)

posed that the transmission arrangement provides the compensating arrangement.

13 Claims, 4 Drawing Sheets

(52) U.S. Cl.
CPC ..... *E05Y 2201/47* (2013.01); *E05Y 2201/626* (2013.01); *E05Y 2201/70* (2013.01); *E05Y 2201/702* (2013.01); *E05Y 2900/546* (2013.01)

(56) References Cited

U.S. PATENT DOCUMENTS

| | | | | |
|---|---|---|---|---|
| 2006/0086047 A1* | 4/2006 | Heitel | ............. | E05F 15/622 49/25 |
| 2006/0125283 A1* | 6/2006 | Guler | ............. | E05F 15/619 296/146.4 |
| 2012/0066977 A1* | 3/2012 | Sitzler | ............. | E05F 15/622 49/358 |
| 2015/0217631 A1* | 8/2015 | Warburton | ............. | B60J 5/103 49/207 |
| 2017/0089112 A1* | 3/2017 | Rosales | ............. | B62D 33/037 |
| 2019/0119971 A1* | 4/2019 | Staehlin | ............. | E05F 15/63 |
| 2020/0346531 A1* | 11/2020 | Dry | ............. | B60P 1/649 |

FOREIGN PATENT DOCUMENTS

| | | | | |
|---|---|---|---|---|
| DE | 102007003601 | | 7/2007 | |
| DE | 102006036548 | | 12/2007 | |
| DE | 102006036548 B3 | * | 12/2007 | ............ E05F 15/614 |
| DE | 102007015965 A1 | * | 10/2008 | ............. E05D 3/06 |
| DE | 102011114925 | | 4/2013 | |
| DE | 102014100125 | | 7/2015 | |
| WO | 2014037468 | | 3/2014 | |

OTHER PUBLICATIONS

"International Search Report and Written Opinion," for International Application No. PCT/EP2017/054729, priority application to U.S. Appl. No. 16/080,634 dated Nov. 22, 2017 (23 pages) with English translation.

"Search Report," for German Application No. 102016103759.1, priority application to U.S. Appl. No. 16/080,634 dated Oct. 7, 2016 (7 pages), no translation available.

* cited by examiner

DRIVE ARRANGEMENT FOR A FLAP OF A MOTOR VEHICLE

CROSS-REFERENCE TO RELATED APPLICATIONS

This application is a national stage application under 35 U.S.C. 371 of International Patent Application Serial No. PCT/EP2017/054729, entitled "Drive System for a Motor Vehicle Hatch," filed Mar. 1, 2017, which claims priority from German Patent Application No. DE 10 2016 103 759.1, filed Mar. 2, 2016, the disclosure of which is incorporated herein by reference.

FIELD OF TECHNOLOGY

The disclosure relates to a drive arrangement for a flap of a motor vehicle and to a flap arrangement of a motor vehicle.

BACKGROUND

Motorized flap arrangements are increasingly used in motor vehicles within the context of increasing convenience. They serve for adjusting flaps between an open position and a closed position (e.g. WO 2014 037 468 A1). The term "flap" should be understood broadly here and comprises tailgates, rear lids, engine hoods, doors, in particular side doors, or the like.

The known drive arrangement (DE 10 2014 100 125 A1), on which the disclosure is based, serves for adjusting the tailgate of a motor vehicle. It has a linear drive which is configured as a spindle drive and is arranged to the side of a rear window. The spindle drive is coupled via a transmission arrangement to the tailgate, on the one hand, and to the motor vehicle body, on the other hand, and therefore the drive movements are transmitted to the flap for the adjustment thereof. The spindle drive has a drive motor and a spindle/spindle-nut transmission downstream of the drive motor. Furthermore, a compensating arrangement is connected between drive motor and spindle/spindle-nut transmission, in the form of an overload clutch which, in the event of an overload, permits a compensating movement between two clutch elements, which are in engagement with each other in a claw-like manner, and therefore damage to drive components in the event of an overload is avoided. To this extent, the known drive arrangement exhibits a high level of operating safety even in the event of an overload. However, the mechanical realization of the overload clutch is complicated and not very flexible in a structural respect since said overload clutch is integrated in the spindle drive.

The known drive arrangement furthermore shows a measure for increasing the operating safety in respect of an inadvertent, gravity-induced adjustment of the flap. Specifically, a helical spring arrangement is connected between the two drive connections of the spindle/spindle-nut transmission, said helical spring arrangement at least opposing a gravity-induced, undesirable adjustment of the flap. Here too, the mechanical realization turns out to be complicated and not very flexible since the required spring arrangement is integrated in the spindle drive. As a result, although the known drive arrangement permits an extremely high level of operating safety, this is achieved, however, at the expense of a complicated mechanical realization and in particular a high outlay for the formation of variants.

SUMMARY

One problem on which the disclosure is based is to configure and develop the known drive arrangement in such a manner that a high level of operating reliability is ensured with a straightforward structural outlay and straightforward formation of variants. The above problem is solved in the case of a drive arrangement according to the disclosure.

The basic consideration that the transmission arrangement, which is coupled to the linear drive for transmitting the drive movements, provides the compensating arrangement, is essential. The compensating arrangement serves first of all for the coupling in terms of drive of two drive elements of the drive arrangement, which drive elements are arranged outside the linear drive. Only in the limit load situation, i.e. when a predetermined limit load between the two drive elements is exceeded, does the compensating arrangement permit a guided compensating movement between the two drive elements. The compensating arrangement ensures here that the dynamic effect between the two drive elements during the compensating movement is limited, and therefore, in turn, damage to drive elements in the event of an overload is avoided.

According to a further teaching, the above problem is solved in the case of a drive arrangement according to the disclosure. The fact that the transmission arrangement can provide spring pretensioning of the drive arrangement with the effect of increasing the operating safety, is essential according to the further teaching. Such spring pretensioning is realized here by a resetting spring arrangement which is assigned to a drive element of the drive arrangement and which pretensions the flap in the mounted state in an adjustment direction.

According to the further teaching, it is essential that the transmission arrangement provides the above-discussed resetting spring arrangement. Alternatively or additionally, it can be provided that the transmission arrangement is coupled to the spring arrangement.

Both teachings according to the proposal are based on the fundamental finding that the transmission arrangement which serves for transmitting the drive movements produced by the linear drive can be used within the scope of increasing the operating safety, namely for realizing a compensating arrangement and for realizing a spring arrangement for spring pretensioning of the drive arrangement. The shifting of said two measures to the transmission arrangement arranged outside the linear drive permits a simplified construction since integration in the linear drive with the associated construction space limitations is not required. Furthermore, a straightforward formation of variants is possible by simple exchange of the transmission arrangement.

In various embodiments, the transmission arrangement has a deflecting unit which is suitable in a particular manner for realizing the compensating arrangement and the spring arrangement.

In various embodiments, the deflecting unit has a deflecting lever with two deflecting lever elements coupled to each other in terms of drive. Different variants for the latching arrangement can thereby be realized in a structurally particularly simple manner.

In various embodiments, it is provided that the two drive elements assigned to the compensating arrangement are always resettable into a normal position relative to each other after the limit load ceases. This is advantageous in so far as possible distance-measuring systems do not have to be recalibrated after the occurrence of the overload situation.

An example for realizing the compensating arrangement is disclosed, in which the drive elements are coupled to each other via a limit load spring arrangement which compresses during the compensating movement. A substantially jolt-free driving of the flap can therefore be realized even in the event of an overload.

Another possibility of realizing the compensating arrangement is disclosed, in which the deflecting lever elements are coupled to each other via a releasable latching arrangement. It is advantageous in this connection that the coupling between the two deflecting lever elements can virtually cease in the event of an overload, and therefore, in turn, damage to drive elements in the event of an overload is particularly effectively avoided.

Various embodiments relate to possibilities for realizing the resetting spring arrangement which serves for spring pretensioning of the drive arrangement. A particularly compact arrangement arises by the fact that the resetting spring arrangement has a spiral spring which, in a furthermore refinement, can be aligned with the pivot axis of the deflecting lever assigned to the resetting spring arrangement.

According to a further teaching, a flap arrangement of a motor vehicle, comprising a flap and a drive arrangement according to one of the two abovementioned teachings is disclosed. Reference should be made to all of the statements regarding the drive arrangements according to the proposal.

Various embodiments provide a drive arrangement for a flap of a motor vehicle, comprising a linear drive for producing drive movements and comprising a transmission arrangement, which is coupled to said linear drive, for transmitting the drive movements, a compensating arrangement being provided which couples two drive elements of the drive arrangement to each other in terms of drive, and, when a limit load between the two drive elements is exceeded, the compensating arrangement permitting a guided compensating movement between the two drive elements, wherein the transmission arrangement provides the compensating arrangement.

Various embodiments provide a drive arrangement for a flap of a motor vehicle, comprising a linear drive for producing drive movements and comprising a transmission arrangement, which is coupled to said linear drive, for transmitting the drive movements, a resetting spring arrangement being assigned to a drive element of the drive arrangement, and the resetting spring arrangement pretensioning the flap in the mounted state in an adjustment direction, in particular in a closing direction, in particular as disclosed herein, wherein the transmission arrangement provides the resetting spring arrangement, and/or wherein the transmission arrangement is coupled to the resetting spring arrangement.

In some embodiments, the linear drive is configured as a spindle drive with a drive motor and a downstream spindle/ spindle-nut transmission, and/or wherein the drive arrangement in the mounted state is assigned to the flap and follows a movement of the flap.

In some embodiments, the transmission arrangement has a deflecting unit with a deflecting lever, wherein the deflecting unit is coupled on the input side to the linear drive and on the output side to a connecting rod, furthermore wherein the deflecting unit produces a deflection of the drive movement by at least 45°, such as by an angle within a range of between 70° and 110°.

In some embodiments, the deflecting lever has two deflecting lever elements which are coupled to each other in terms of drive and each provide a drive element assigned to the compensating arrangement.

In some embodiments, the drive elements assigned to the compensating arrangement are in a normal position with respect to each other in normal operation, carry out the compensating movement from the normal position in the limit load situation and, when the limit load ceases, are resettable into the normal position, such as wherein, when the limit load ceases, the drive elements are reset into the normal position in a spring-driven manner.

In some embodiments, the compensating arrangement permits the compensating movement out of the normal position in two opposed directions of movement.

In some embodiments, the drive elements assigned to the compensating arrangement, in particular deflecting lever elements, are coupled to each other via a limit load spring arrangement of the compensating arrangement, which limit load spring arrangement compresses during the compensating movement, such as wherein the limit load spring arrangement has at least one wire spring, in particular a leg spring, and/or wherein the limit load spring arrangement has at least one elastically compressible element, and/or wherein the limit load spring arrangement has at least one resilient plate, in particular a resilient punched and bent part.

In some embodiments, the deflecting lever elements are coupled to each other via a latching arrangement of the compensating arrangement, which latching arrangement is released in the limit load situation.

In some embodiments, the two deflecting lever elements each have latching formations which, during normal operation, are held in form-fitting and force-fitting engagement with each other via a latching spring arrangement, and wherein, when the limit load between the deflecting lever elements is exceeded, the mutually assigned latching formations of the deflecting lever elements are disengaged from each other, such as wherein the mutually assigned latching formations slide along on each other.

In some embodiments, the resetting spring arrangement is coupled to the deflecting lever of the deflecting unit.

In some embodiments, the resetting spring arrangement has a spiral spring, such as wherein the spiral spring is aligned with a pivot axis of the deflecting lever assigned to the resetting spring arrangement.

In some embodiments, the resetting spring arrangement has a helical spring, in particular a helical tension spring, which is coupled at a point spaced apart from a pivot axis of the deflecting lever.

Various embodiments provide a flap arrangement of a motor vehicle, comprising a flap and a drive arrangement for adjusting the flap as described herein.

In some embodiments, the drive arrangement is assigned to the flap and follows a flap movement.

BRIEF DESCRIPTION OF THE DRAWINGS

The disclosure is explained in more detail below with reference to drawings which merely illustrate one exemplary embodiment. In the drawings.

DETAILED DESCRIPTION

Figure 1:
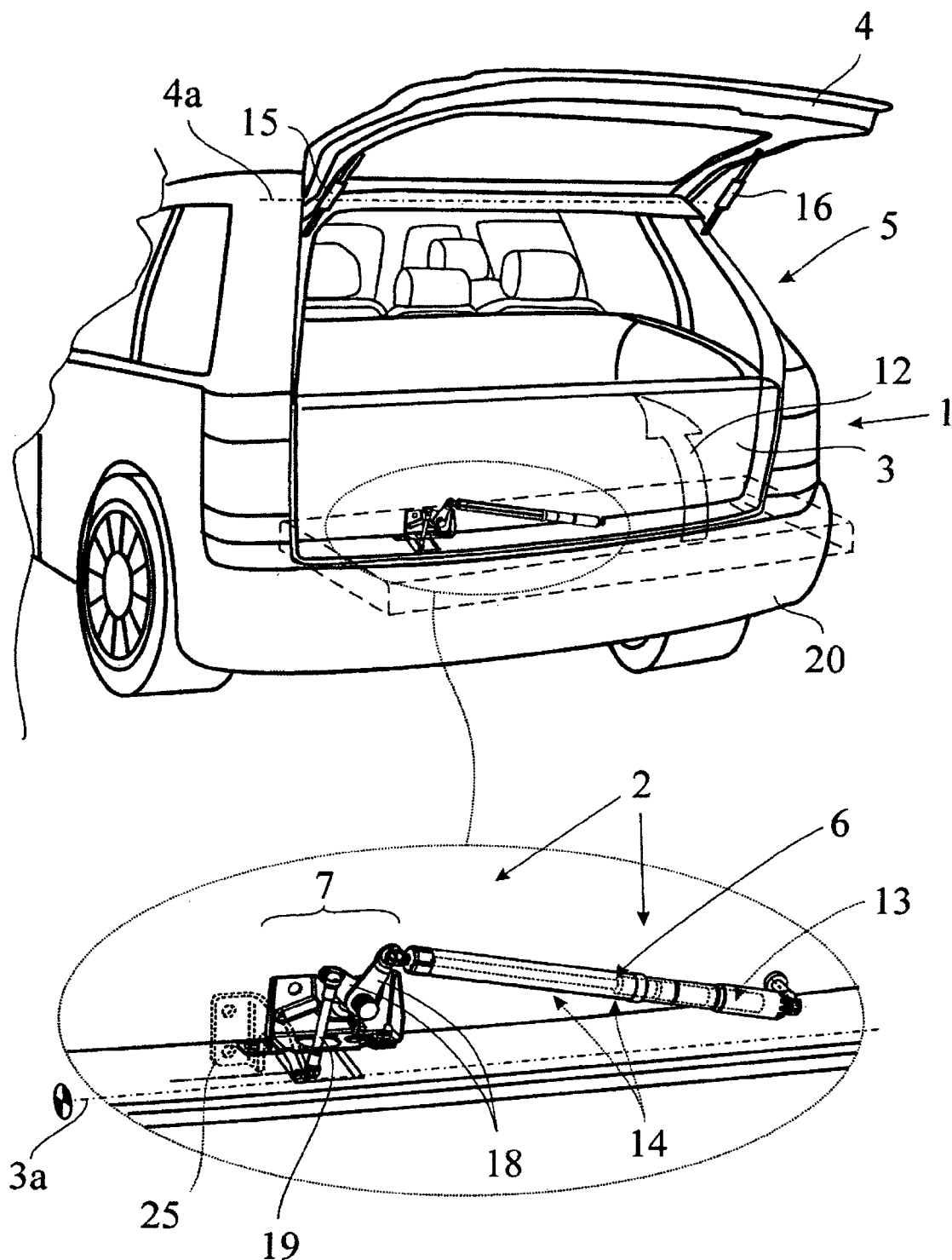
FIG. 1 shows the rear region of a motor vehicle with a flap arrangement according to the proposal which is provided with a drive arrangement according to the proposal.

The flap arrangement 1 illustrated in the drawings has a drive arrangement 2 and a flap 3 of a motor vehicle. The drive arrangement 2 serves for the motorized adjustment of the flap 3 between the closed position, illustrated by a solid line in FIG. 1, and the open position, illustrated by a dashed line in FIG. 1.

In the case of the exemplary embodiment which is illustrated in FIG. 1, the flap arrangement 1 is divided in two. The flap 3 which has already been discussed is the lower flap and a further flap 4 is the upper flap. The two flaps 3, 4 are each pivotable about a substantially horizontal flap axis 3a, 4a. The two flaps 3, 4 close a flap opening 5 of the flap arrangement 1 if the two flaps 3, 4 are in the closed state. FIG. 1 shows the upper flap 4 exclusively in the open position.

The lower flap 3 to which the drive arrangement 2 according to the proposal is assigned is in the foreground here. All statements in this regard can basically correspondingly apply to the upper flap 4.

The drive arrangement 2 according to the proposal is provided with a linear drive 6 for producing linear drive movements, said linear drive being configured here as a spindle drive. A transmission arrangement 7 for transmitting the drive movements is coupled to the linear drive 6. The transmission arrangement 7 can be an individual transmission element or, as here, a transmission mechanism which is yet to be explained.

In order, in particular in the event of an overload, to avoid damage to drive components of the drive arrangement 2, a compensating arrangement 8 is provided which couples two drive elements 9, 10 of the drive arrangement 2 to each other in terms of drive. A "drive element" of the drive arrangement 2 should be understood as meaning an element which is arranged in the dynamic effect chain required for producing the drive movements, i.e. which serves for transmission of drive forces.

When a limit load between the two drive elements 9, 10 is exceeded, the compensating arrangement 8 permits a guided compensating movement between the two drive elements 9, 10. A limit load situation which, depending on the definition of the limit load, may also be an overload situation is involved here. "Guided compensating movement" means that, although the coupling of the two drive elements 9, 10 is, at any rate partially, cancelled, the movements of the drive elements 9, 10 continue to be guided.

The compensating arrangement 8 can be undertaken in such a manner that the drive force which is transmittable between the drive elements 9, 10 during the compensating movement is limited. This limiting makes it possible to effectively avoid damaging drive elements of the drive arrangement 2, even if, for example due to erroneous operation, a high load acts from the flap 3 on the drive arrangement 2. Such a compensating arrangement 8 is shown in FIGS. 2 and 3 in two embodiments.

Figure 2:
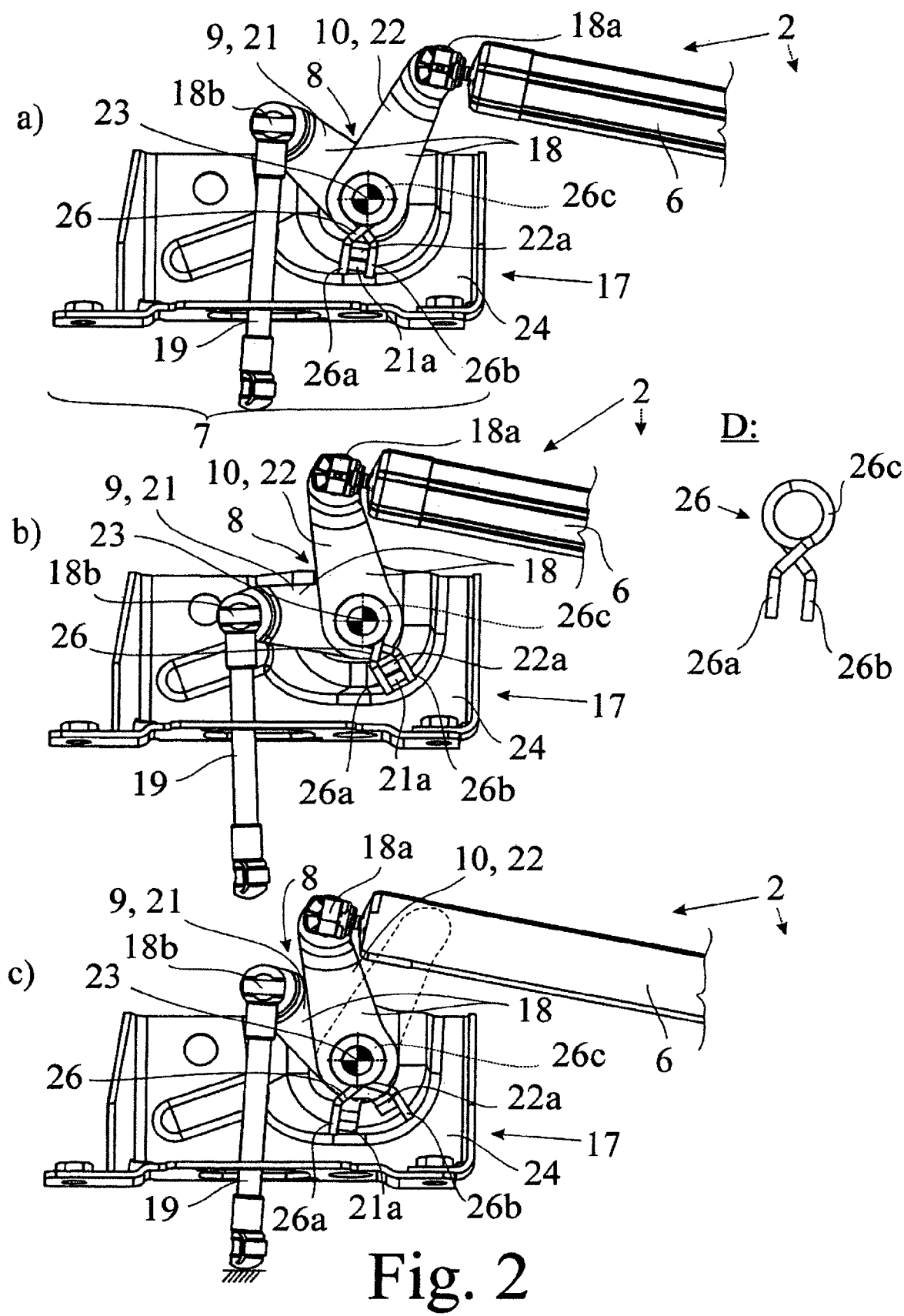
FIG. 2 shows the transmission arrangement of the drive arrangement according to FIG. 1 in a first embodiment a) when the flap is closed, b) when the flap is open, c) in the limit load situation.
Figure 3:
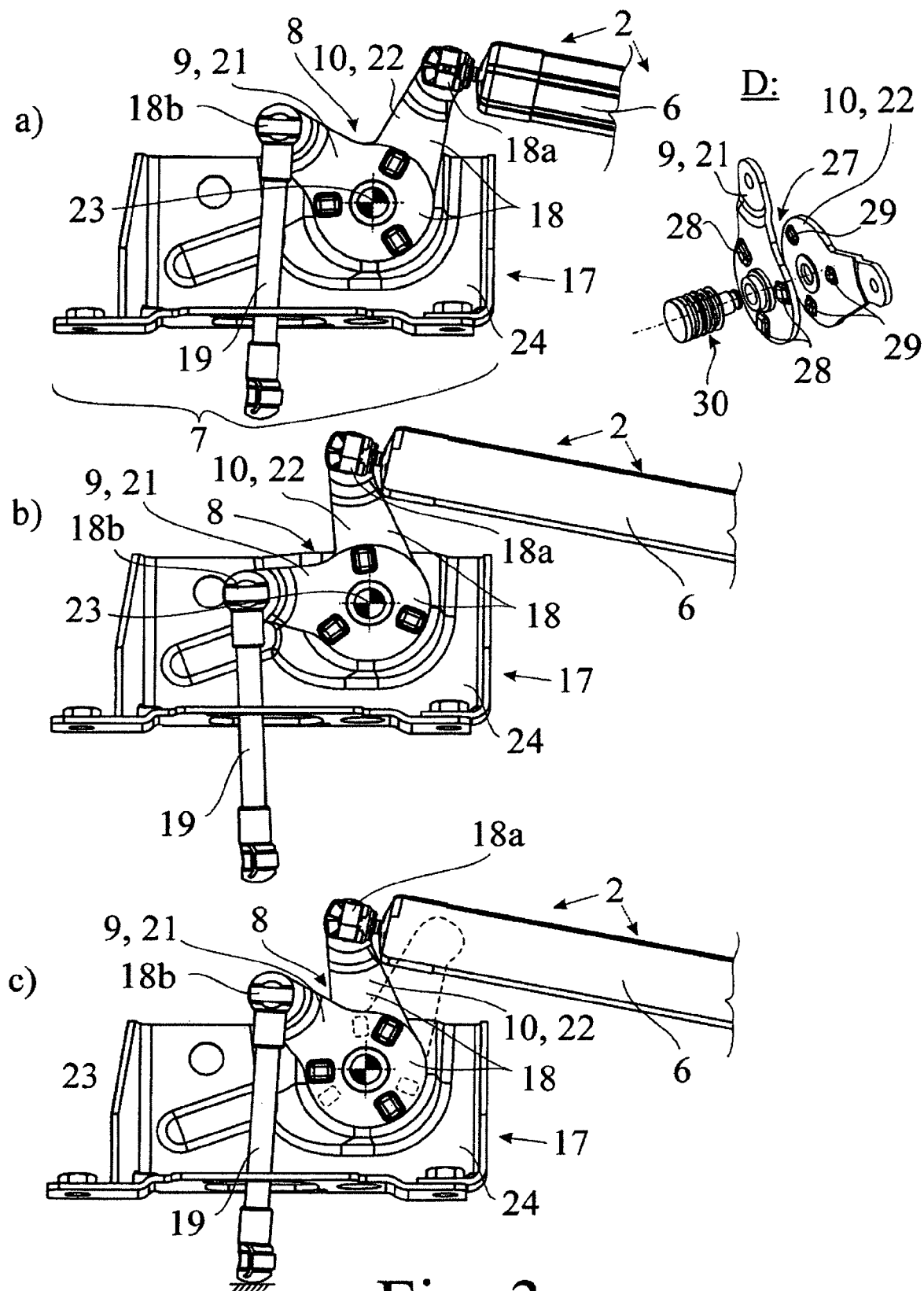
FIG. 3 shows the transmission arrangement of the drive arrangement according to FIG. 1 in a second embodiment a) when the flap is closed, b) when the flap is open, c) in the limit load situation.

It is essential, in the case of the two embodiments illustrated in FIGS. 2 and 3, that the transmission arrangement 7 also provides the compensating arrangement 8. The compensating arrangement 8 is therefore not assigned to the linear drive 6, but rather to the transmission arrangement 7. The compensating arrangement 8 can therefore be configured independently of the linear drive 6, and therefore structural limitations caused by construction space cease to apply in the configuration of the compensating arrangement 8. This can be gathered from the illustrations of FIGS. 2 and 3. Furthermore, the possibility is afforded of providing various variants for the compensating arrangement 8 without changing the linear drive 6. This overall simplifies the formation of variants.

Figure 4:
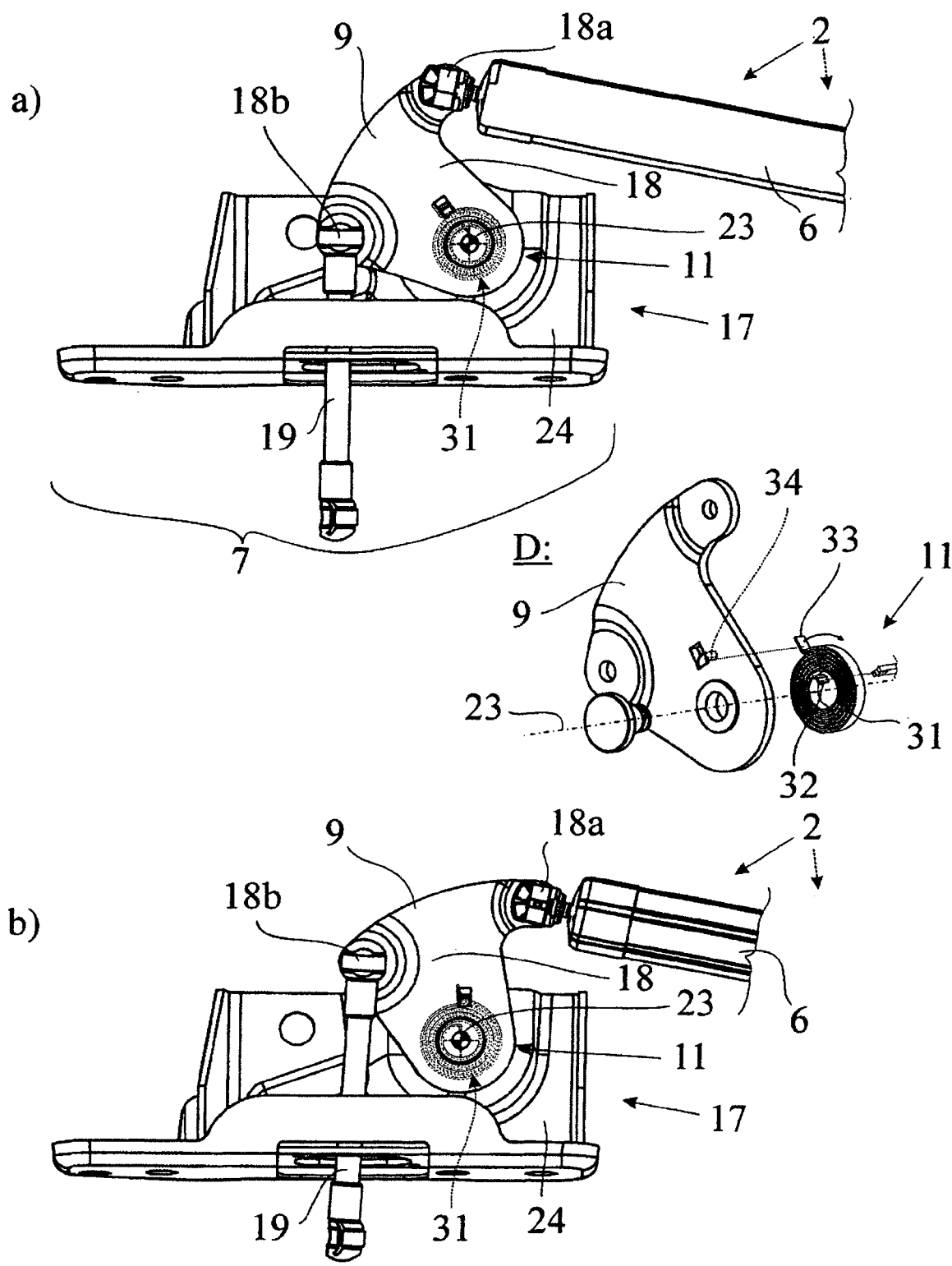
FIG. 4 shows the transmission arrangement of the drive arrangement according to FIG. 1 in a third embodiment a) when the flap is closed, and b) when the flap is open.

FIG. 4 shows a drive arrangement 2, wherein a resetting spring arrangement 11 is assigned to a drive element 9 of the drive arrangement 2, and wherein the resetting spring arrangement 11 pretensions the flap 3 in the mounted state in an adjustment direction, here in a closing direction 12 of the flap 3. The resetting spring arrangement 11 can be configured in such a manner that it assists an adjustment of the flap 3 counter to gravitational force. Here, as discussed above, this is the closing direction 12.

It is essential for the configuration according to FIG. 4 that the transmission arrangement 7 provides the resetting spring arrangement 11. In addition, in the case of the exemplary embodiment which is illustrated, the transmission arrangement 7 is coupled to the resetting spring arrangement 11. It can basically also be provided that only one coupling is provided here between the transmission arrangement 7 and the resetting spring arrangement 11.

The drive arrangements 2 of FIGS. 2, 3 and the drive arrangement 2 of FIG. 4 primarily differ in the realization of a compensating arrangement 8 and a resetting spring arrangement 11. Furthermore, all of the explanations relating to the various embodiments apply in an alternately corresponding manner. In particular, it should be emphasized that each drive arrangement 2 which is illustrated can be provided both with a compensating arrangement 8 and with a resetting spring arrangement 11.

The linear drive 6 is configured here as a spindle drive with a drive motor 13 and a spindle/spindle-nut transmission 14 downstream of the drive motor 13. It can be gathered from the illustration according to FIG. 1 that the drive arrangement 2 as a whole in the mounted state is assigned to the flap 3 and follows a flap movement. The drive arrangement 2 is correspondingly arranged here in a cavity of the flap 3. Alternatively, it could be provided that the drive arrangement 2 is arranged laterally next to the flap 3. This is illustrated by way of example in FIG. 1 for the drive arrangements 15, 16 which are assigned to the upper flap 4. Furthermore alternatively, it can be provided that the drive arrangement 2 is arranged in the body of the motor vehicle, in particular in a rear roof frame (for the upper flap 4) or below the loading surface (for the lower flap 3).

A particularly compact refinement arises in the case of the exemplary embodiment illustrated in FIG. 1 by the fact that the transmission arrangement 7 has a deflecting unit 17 with a deflecting lever 18. It can be possible for the deflecting unit 17 to be coupled on the input side to the linear drive 6 and on the output side to a connecting rod 19. In a first approximation, a lateral driving movement, which runs substantially along the extent of the rear bumper 20 of the motor vehicle, is deflected by the deflecting unit 17 into a substantially downwardly or upwardly directed movement. The deflecting unit 17 can produce a deflection of the driving movement by at least 45°, furthermore within a range of between 70° and 110°. Extraordinary compactness of the drive arrangement 2 can therefore be achieved, as FIG. 1 shows.

The deflecting lever 18 here has an input-side connection 18a and an output-side connection 18b, which are arranged at different points of the deflecting lever 18, on different lever arms of the deflecting lever 18 in FIGS. 2 and 3.

In the case of the embodiments illustrated in FIGS. 2 and 3, the deflecting lever 18 is in each case of multi-part design. Specifically, the deflecting lever 18 has two deflecting lever elements 21, 22 which are coupled to each other in terms of drive during normal operation and each provide a drive element 9, 10 assigned to the compensating arrangement 8.

The deflecting lever 18, irrespective of its configuration, can be mounted on the flap 3 so as to be pivotable about a deflecting lever axis 23. In the case of the exemplary embodiments which are illustrated, the deflecting lever 18 is coupled pivotably to a carrier element 24, wherein the carrier element 24 is fastened to the flap 3.

During normal operation, in which the load moves between the drive elements 9, 10, which are assigned to the compensating arrangement 8, below the limit load, the drive elements 9, 10 are in a normal position with respect to each other, as shown in FIGS. 2a, b and FIGS. 3a, b.

FIG. 2a and FIG. 3a show the deflecting unit 17 during normal operation when the flap 3 is located in the closed position. The transition from FIG. 2a to FIG. 2b and from FIG. 3a to FIG. 3b shows the motorized opening of the flap 3. A compressive force is conducted here via the connecting rod 19 onto the body of the motor vehicle, here onto the counterbearing 25, as a result of which a driving moment about the flap axis 3a of the flap 3 in the opening direction arises. By contrast, the motorized closing of the flap 3 takes place by the transmission of a tensile force via the connecting rod 19. The opening of the flap 3 is therefore based on an extension of the linear drive 6, which is configured as a spindle drive, while the closing of the flap 3 is based on a contraction of the linear drive 6, which is configured as a spindle drive.

FIG. 2c and FIG. 3c show the limit load situation in which the load, here the torque between the two drive elements 9, 10, exceeds a limit load, i.e. a limit moment. Said limit load situation can be caused, for example, by the flap 3 being held in the closed position during the motorized opening. This is apparent from an overall view of FIG. 2a and FIG. 2c, and also FIG. 3a and FIG. 3c. When the limit load between the two drive elements 9, 10 ceases, the drive elements 9, 10 can be returned again into their normal position with respect to each other. In the case of the exemplary embodiment which is illustrated in FIG. 2, when the limit load ceases, the drive elements 9, 10 can be reset into the normal position in a spring-driven manner, as emerges from the transition from FIG. 2c to FIG. 2a.

In the case of both exemplary embodiments illustrated in FIGS. 2 and 3, the compensating arrangement 8 permits the compensating movement out of the normal position in two opposed directions of movement. The illustrations according to FIG. 2c and FIG. 3c correspond to a compensating movement in a first direction, while the position of the drive element 10, which is illustrated by dashed lines in FIG. 2c and FIG. 3c, corresponds to a compensating movement in the opposed direction of movement.

As can be gathered from the illustrations of FIG. 2 and FIG. 3, the drive elements 9, 10 are each pivotable about the deflecting lever axis 23. This permits a particularly simple coupling of the drive elements 9, 10 by means of the compensating arrangement 8. In the case of the exemplary embodiment which is illustrated in FIG. 2, the drive elements 9, 10, here the deflecting lever elements 21, 22, which, as discussed above, are pivotable about the deflecting lever axis 23, are coupled to each other via a limit load spring arrangement 26 of the compensating arrangement 8, which limit load spring arrangement compresses during the compensating movement. The limit load spring arrangement 26 here has at least one wire spring, such as at least one leg spring, which is coupled at its leg ends 26a, 26b to a respective deflecting lever element 21, 22. The arrangement here is made in such a manner that the leg ends 26a, 26b are spread independently of the direction of movement of the compensating movement. For the engagement with the leg ends 26a, 26b, the deflecting lever elements 21, 22 each have an engagement element 21a, 22a which is spaced apart from the deflecting lever axis 23. The leg spring can be furthermore configured in the manner of an omega spring.

In the case of the exemplary embodiment which is illustrated, the limit load spring arrangement 26 having a leg spring is aligned with the deflecting lever axis 23. This means that the spring turns 26c of the limit load spring arrangement 26 are aligned concentrically with respect to the deflecting lever axis 23.

In the case of the spring-based refinement of the compensating arrangement 8 that is illustrated in FIG. 2, the passage of the compensating movement in each case corresponds to a compression of the limit load spring arrangement 26. Given a suitable configuration of the limit load spring arrangement 26, the driving force which can be transmitted via the deflecting lever elements 21, 22 can be effectively limited, and therefore, in particular in the event of an overload, damage to drive components is avoided.

In principle, however, the limit load spring arrangement 26 can also have at least one elastically compressible element, such as composed of a compressible plastic or the like, which provides a corresponding spring effect. Alternatively or additionally, it can furthermore be provided that the limit load spring arrangement 26 has at least one resilient plate, in particular a resilient punched and bent part, for providing the spring effect.

A further refinement of the compensating arrangement 8 is shown in FIG. 3, in which the deflecting lever elements 21, 22 are coupled to each other via a latching arrangement 27, wherein the latching arrangement 27 is released in the limit load situation. Here, resetting of the deflecting lever elements 21, 22 into the normal position shown in FIG. 3a and FIG. 3b can take place manually. A spring-based resetting is not provided here. In principle, however, such a spring-based resetting can be realized by an additional resetting spring.

In order to produce the latching connection, the two deflecting lever elements 21, 22 each have latching formations 28, 29 which, during normal operation, are held in form-fitting and force-fitting engagement with each other via a latching spring arrangement 30. This is shown in the exploded illustration in FIG. 3a, according to which the latching formations 28 of the deflecting lever element 21 are configured concavely and the latching formations 29 of the deflecting lever element 22 are configured convexly, specifically in such a manner that a concave latching formation 28 is in each case in form-fitting engagement with a convex latching formation 29 if the deflecting lever elements 21, 22 are in the normal position. The mutually complementary formation directions of the latching formations 28, 29 are each provided substantially along the deflecting lever axis 23. In order to hold the above form-fitting connection, the latching spring arrangement 30 presses the two deflecting lever elements 21, 22 against each other in the axial direction with respect to the deflecting lever axis 23.

In the limit load situation, i.e. when the limit load between the deflecting lever elements 21, 22 is exceeded, the mutually assigned latching formations 28, 29 of the deflecting lever elements 21, 22 are disengaged. This is generally associated with a slight axial adjustment, with respect to the deflecting lever axis 23, of the deflecting lever elements 21, 22 in relation to each other. This decoupling of the deflecting lever elements 21, 22 from each other can be based on the fact that the mutually assigned latching formations 28, 29 slide along on each other. For this purpose, the latching formations 28, 29 have corresponding slopes which finally bring about the above axial adjustment of the deflecting lever elements 21, 22 in relation to each other.

In principle, the drive elements 9, 10 assigned to the compensating arrangement 8 can be adjustable linearly with respect to each other in the event of an overload (not illustrated). For example, the one drive element 9 can here be mounted in a spring-pretensioned manner in an elongate hole of the other drive element 10, wherein the compensating movement is the passage through the elongate hole by the one drive element 9. The two drive elements 9, 10 here can together form a coupling rod, in particular the above-discussed connecting rod 19, in particular with a ball head connection on one side or both sides.

In another embodiment (likewise not illustrated), the two drive elements 9, 10 are each part of an overall drive element which can be configured as a single part. The overall drive element can have spring elasticity, by means of which the overall drive element elastically compresses when the limit load between the two drive elements is exceeded. The drive elements 9, 10 here can each form, for example, a lever arm of the overall drive element, wherein at least one of the two lever arms can be configured in a spring-elastic manner. The spring elasticity can be realized, for example, by the fact that the overall drive element is configured, at least in sections, from a resilient sheet-metal part, in particular a resilient punched and bent part. The overall drive element can form an above-discussed deflecting lever 18.

FIG. 4 shows the drive arrangement 2 according to the teaching mentioned second, in which a resetting spring arrangement 11 is provided for spring pretensioning of the flap 3 in an adjustment direction.

In principle, the resetting spring arrangement 11 can be configured in such a manner that it holds the flap 3 against its weight at least in an adjustment region. However, it is also conceivable for the resetting spring arrangement 11 to be configured to be weaker and to only provide a certain compensation of the weight acting on the flap 3.

In some embodiments, in addition to the resetting spring arrangement 11 at least one resetting spring arrangement is provided which acts on the drive train of the drive arrangement 2. In some embodiments, the linear drive 6, which is configured as a spindle drive, has a resetting spring arrangement, in particular in the form of a helical spring, which pretensions the linear drive 6 into the extended position or into the retracted position. In such a case, the spring effects of the resetting spring arrangements can be coordinated with each other in such a manner that a predetermined profile of the resulting spring pretensioning arises over the adjustment range of the flap 3.

FIG. 4 shows a refinement of a resetting spring arrangement 11 which brings about spring pretensioning of the flap 3 in the closing direction thereof. For this purpose, the resetting spring arrangement 11 pretensions the deflecting lever 18 in the clockwise direction in FIG. 4a.

The resetting spring arrangement 11 which is illustrated in FIG. 4 and to this extent can have a spiral spring 31, wherein here the spiral spring 31 is aligned with a pivot axis of the deflecting lever 18 assigned to the resetting spring arrangement 11. Said pivot axis here is the deflecting lever axis 23. The spiral spring 31 has two connections 32, 33 which are in engagement with the body of the motor vehicle, here with the carrier element 24, on the one hand, and with the deflecting lever 18, here with a lug 34 arranged on the deflecting lever 18, on the other hand. The illustration according to FIG. 4 shows that a particularly compact arrangement is achievable with the explained refinement and arrangement of a spiral spring 31.

Alternatively or additionally, the resetting spring arrangement 11 can have a helical spring (not illustrated), here a helical tension spring which is coupled at a point spaced apart from a pivot axis of the deflecting lever 18, here at a point spaced apart from a deflecting lever axis 23 of the deflecting lever 18. This leads to a particularly cost-effective and simultaneously readily adjustable resetting spring arrangement 11.

According to a further teaching, which likewise obtains independent importance, the flap arrangement 1 of a motor vehicle, comprising a flap 3 and a drive arrangement 2 according to the proposal for adjusting the flap 3, is disclosed as such. Reference should be made to all of the statements regarding both teachings mentioned above.

In some embodiments, the drive arrangement 2 as such is assigned to the flap 3 and follows a flap movement, as has likewise been described further above. The accommodating of the drive arrangement 2 in the flap 3 can be realized in a structurally particularly simple and simultaneously robust manner in particular by the transmission arrangement 7 being provided with the deflecting unit 17 discussed above.

The invention claimed is:

1. A drive arrangement for adjusting a flap of a motor vehicle between a fully closed position and a fully open position, comprising a linear drive for producing drive movements and comprising a transmission arrangement, which is coupled to said linear drive, for transmitting the drive movements, a compensating arrangement which couples two drive elements of the drive arrangement to each other, and, when a limit load between the two drive elements is exceeded, the compensating arrangement is configured to permit a guided compensating movement between the two drive elements, wherein the compensating arrangement is part of the transmission arrangement, wherein the transmission arrangement has a deflecting unit with a deflecting lever, wherein the deflecting unit comprises two deflecting lever elements which are coupled to each other such that a driving force can be transmitted between the two deflecting lever elements and wherein each of the two deflecting lever elements forms a respective one of the two drive elements for the compensating arrangement.

2. The drive arrangement as claimed in claim 1, wherein the drive elements for the compensating arrangement are in a normal position with respect to each other in normal operation, carry out the compensating movement from the normal position in the limit load situation and, when the limit load ceases, are resettable into the normal position.

3. The drive arrangement as claimed in claim 2, wherein the compensating arrangement permits the compensating movement out of the normal position in two opposed directions of movement.

4. The drive arrangement as claimed in claim 3, wherein the drive elements for the compensating arrangement, are coupled to each other via a limit load spring arrangement of the compensating arrangement, which limit load spring arrangement compresses during the compensating movement.

5. The drive arrangement as claimed in claim 1, wherein the deflecting lever elements are coupled to each other via a latching arrangement of the compensating arrangement, which latching arrangement is released in the limit load situation.

6. The drive arrangement as claimed in claim 5, wherein the two deflecting lever elements each have latching formations which, during normal operation, are held in form-fitting and force-fitting engagement with each other via a latching spring arrangement, and wherein, when the limit load between the deflecting lever elements is exceeded, the mutually assigned latching formations of the deflecting lever elements are disengaged from each other.

7. The drive arrangement as claimed in claim 6, wherein the latching spring arrangement is coupled to the deflecting lever of the deflecting unit.

8. A flap arrangement of a motor vehicle, comprising a flap and a drive arrangement as claimed in claim 1 for adjusting the flap.

9. The flap arrangement as claimed in claim 8, wherein the drive arrangement is for the flap and follows a flap movement.

10. The drive arrangement as claimed in claim 1, wherein the deflecting unit produces a deflection of the drive movement by at least 45°.

11. The drive arrangement as claimed in claim 2, wherein, when the limit load ceases, the drive elements are reset into the normal position in a spring-driven manner.

12. The drive arrangement as claimed in claim 4, wherein the limit load spring arrangement has at least one wire spring, or wherein the limit load spring arrangement has at least one elastically compressible element, or wherein the limit load spring arrangement has at least one resilient plate.

13. The drive arrangement as claimed in claim 6, wherein the mutually assigned latching formations slide along on each other.

* * * * *